United States Patent [19]

Labbus et al.

[11] Patent Number: 4,935,836
[45] Date of Patent: Jun. 19, 1990

[54] GUARD CIRCUIT FOR THE PROTECTION OF CAPACITIVE LOADS

[75] Inventors: Juergen Labbus, Brake; Ralf Bertram, Jever, both of Fed. Rep. of Germany

[73] Assignee: Bicc-Vero Electronics GmbH, Bremen, Fed. Rep. of Germany

[21] Appl. No.: 341,363

[22] Filed: Apr. 21, 1989

[30] Foreign Application Priority Data

Apr. 27, 1988 [DE] Fed. Rep. of Germany ....... 3814251
Jul. 19, 1988 [DE] Fed. Rep. of Germany ....... 3824583

[51] Int. Cl.$^5$ .............................................. H02H 3/00
[52] U.S. Cl. ...................................... 361/15; 361/79; 361/91; 361/93
[58] Field of Search ................... 361/15, 79, 86, 87, 361/88, 89, 91, 93, 94, 98, 101, 102

[56] References Cited

U.S. PATENT DOCUMENTS

| | | | |
|---|---|---|---|
| 4,414,598 | 11/1983 | Nowell | 361/18 |
| 4,420,787 | 12/1983 | Tibbits et al. | 361/79 |
| 4,703,387 | 10/1987 | Miller | 361/79 |
| 4,719,531 | 1/1988 | Okada et al. | 361/86 |

FOREIGN PATENT DOCUMENTS 130254 9/1985 European Pat. Off. .
150820 9/1981 German Democratic Rep. .

OTHER PUBLICATIONS

Elektrotecknik German Technical Journal, Jun. 1977, pp. 14–19.
ITT Intermetall Company publication, Edition 1973/3, pp. 158, 159.

*Primary Examiner*—Derek S. Jennings
*Attorney, Agent, or Firm*—Marshall, O'Toole, Gerstein, Murray & Bicknell

[57] ABSTRACT

The DIN Standard VDE 160/01.86 involves specific requirements as far as the dielectric strength of electronic devices is concerned which are intended for operation at high-voltage networks. A guard circuit for the protection of capacitive loads is described. In this system, a current detector means is provided to detect the current flowing into the load and to emit a first blocking signal at least when the amount of the detected current exceeds a preset maximum value. A voltage detector means is provided to detect the voltage in the supply network and to emit a second blocking signal when the amount of the detected voltage exceeds a preset maximum value. A controllable switching means is provided which is so designed and in such controlled communication with the current and voltage detector means that the load will be isolated from the supply network as soon as at least one of the two blocking signals is applied.

12 Claims, 4 Drawing Sheets

GUARD CIRCUIT FOR THE PROTECTION OF CAPACITIVE LOADS

BACKGROUND OF THE INVENTION

The present invention relates to a guard circuit for the protection of capacitive loads.

In the operation of electronic systems connected to AC supply networks, not only very short interference voltages in the high-frequency range must be expected, which may be filtered out through low-pass filters of small dimensions with a high limit frequency, but also interference pulses whose half-amplitude pulse duration comes within the range of milliseconds. This holds true particularly when industrial machinery, rail-bound systems, heating installations or the like are operated from the supply network. Since the rising edges of such interference pulses are very steep the risk of interference with an electronic equipment is particularly high when the latter constitutes a capacitive load connected to the network. The DIN Standard VDE 0160/01.86 defines these voltage pulses so that an ultimate purchaser of an electronic device tested in compliance with that Standard may operate the unit from such a network without any further hesitation.

In order to protect the unit from such interference pulses it is possible to connect, for instance, a magnetic stabilizer or regulator or even only an isolating transformer ahead of the device. On the other hand, however, this series connection of such an additional element entails comparatively high costs and on the other hand such devices are voluminous in the event of major demands to performance, which counteracts, however, the miniaturization attempts which are always present in electronics.

From the German technical journal DEZ "Elektrotechink", issue of Jun. 1977, No. 11, pages 14 to 19, examples of circuits for the protection specifically of a push-pull voltage converter have become known. In particular, that publication proposes the connection of a current-limiting resistor ahead of the power rectifier. This measure, however, results in a reduction of the period between link-up with the supply network and the time by which the equipment reaches its full capacity. Moreover, the circuit includes a filter capacitor and switching transistors intended to limit overcurrents. The measures taken in that example, however, are not suitable to block out reasonably pulse-type overvoltages of the kind defined by way of introduction hereto.

From the East German Patent No. DD 150 820, a circuit arrangement has become known for the reduction of the short-circuit current in switching network elements, which includes an LC member. This circuit is not suitable either to block pulse-type overvoltages but rather offers itself only for short-circuit protection of parts of a switching network.

In the publication "Schaltbeispiele mit diskreten Halbleiterbauelementen" (Switching Examples with Discrete Semiconductor Elements) by the Intermetall company, issue 1973/3, pages 158 and 159, a transistor switch for AC loads is described which includes a transistor as the controllable switch element in the cross branch of a bridge circuit made up by diodes in anti-parallel arrangement. This circuit, however, is not suitable to block off pulse-type overvoltages.

In the U.S. Pat. No. 44 14 598, a controlled power supply is described which includes an opto-coupler for electric isolation of a blocking signal. With this system, however, it is not possible either to suppress pulse-type overvoltages.

It has become known from the European Patent No. EP-A-130 254 that it is possible to supply a circuit for a line disconnector with power from the supply network. That publication, however, does not disclose any reference to the blocking of pulse-type overvoltages.

SUMMARY OF THE INVENTION

Proceeding from the aforedefined state of prior art, the present invention is based on the problem of improving a guard circuit of the type described by way of introduction to the effect that a cost-effective miniaturization will be achieved while the anti-interference effect will be retrained.

This problem is solved by means of a guard circuit including a current detector means to detect the current flowing through the load and to emit a first blocking signal at least when the amount of the detected current exceeds a defined maximum value, a voltage detector means to detect the voltage applied in said supply network and to emit a second blocking signal when the amount of the detected voltage exceeds a defined maximum value, and a controllable switching means communicating with and under control of said current detector means and said voltage detector means so as to isolate the load from the supply network, with said controllable switching means isolating the load from the supply network when at least one of said first or second blocking signals is applied.

Whenever, a voltage pulse of the aforedescribed type will arise in the supply network initially the input current will undergo a rapid increase as a result of the capacitive load. As soon as the input current will exceed the present maximum value the current is limited and therefore controlled. As a result of this the input voltage now will increase more rapidly. As soon as the input voltage will exceed the present maximum value the load is isolated from the network, which, as a result of the energy stored in the load, is not yet a complete disconnection of the energy supply for the load or the electronic device. As soon as the load is disconnected from the network the voltage assumes the value defined by the network. As soon as the voltage will drop again below the maximum value permissible for the load, which means that the interference pulse will thus cease to be dangerous, the load is reconnected to the network whereupon the "normal operation" is resumed.

The application of the novel guard circuit in power packs under primary clock pulse control is particularly advantageous, which, on the one hand, constitute a (high) capacitive load but, on the other hand, are specifically designed to avoid the use of large-size power transformer. In these power packs under primary clock pulse control there is the problem that the design of the input components, specifically the capacitors and power transistors in the input circuit, is a crucial task anyhow. The design of such input components in a way that the dielectric strengths required according to the Standard is practically impossible for economic reasons.

When the inventive system is used in combination with a power pack under primary clock pulse control another advantage will be achieved due to the fact that the guard circuit operates at the same time as a current limiting device when the unit is switched on. On the other hand, the guard circuit may be designed in a way that it responds at a higher speed than with the NTCs so far common, and on the other hand the inventive guard circuit will be effective even when the capacitive load will be switched on and off (for shorter intervals) consecutively for several times.

The load is preferably not linked up with the network at the same time with the current dropping below the maximum value (with a restriction only due to the switching periods of the components used) but only a short time later. It is thus possible to avoid a high-frequency oscillation of the components when the load is switched on for the first time while a high thermal load of the components will be avoided.

Preferably a filter system for the high-frequency interference voltages is provided which is known per se and is influenced by the load current, said voltages being defined by way of introduction hereto, which system filters also the reactive effects specifically when being used in power packs under primary clock pulse control.

When the guard circuit will be used in power packs under primary clock pulse control the system will become particularly simple when it is disposed between the rectifier, which is provided anyhow, and the input capacitors of the power pack, since the guard circuit has to be designed only for a (pulsating) DC voltage in such a case.

Further features essential of the present invention result from the dependent claims and the following description of preferred embodiments thereof which will be explained in more details with reference to the drawings wherein:

DETAILED DESCRIPTION

Figure 1:
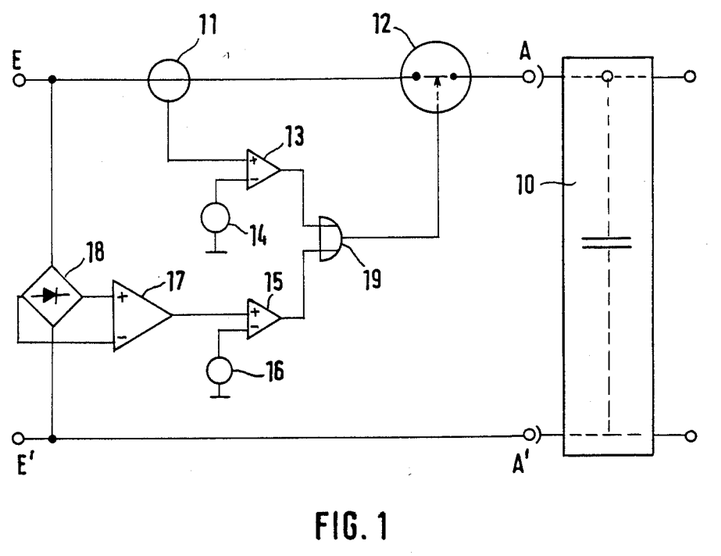
FIG. 1 is the basic block diagram of a guard circuit.

In FIG. 1, the reference letters E, E' designate input terminals, while letters A, A' identifiy output terminals of the guard circuit, with the input terminals E, E' being linked up with the supply network and the output terminals A, A' being connected to a capacitive load 10. The input terminal E' is directly connected to the output terminal A' whereas the input terminal E is linked up with the output terminal A through a controllable switch 12. A current measuring device 11 is provided in the line between the input terminal E and switch 12 so as furnish a current-proportional output signal which is supplied to a first comparator 13. The further (inverting) input of the comparator 13 communicates with the output of a reference voltage source 14 so that always a high level will be present at the output when the output signal from the current measuring device, which is proportional to the load current, exceeds the voltage level of the reference voltage source 14.

The input terminals of a bridge rectifier 18 are connected to the input terminals E, E', while the output terminals of that rectifier are applied to a differential amplifier 17 with a constant gain. That differential amplifier 17 output where a DC voltage is applied that is proportional to the amount of the AC voltage amplitude is linked up with one input of another comparator 15 whose other input is applied to the output of another reference voltage source 16. Whenever the amount of the voltage at the input terminals E, E' exceeds the value defined by the reference voltage source 16 the output of the comparator 15 is switched over to the high level.

The outputs of the comparator 13 and 15 are applied to two inputs of an OR gate 19 whose output is thus always set to the high level when either the load current or the input voltage will exceed the values respectively defined by the reference voltage sources 14, 16.

The output of the OR gate 19 is connected to a control input of the controllable switch 12. That controllable switch 12 is so designed that it will be open when a high potential is applied to its control input.

The system illustrated in FIG. 1 operates as follows:

When an interference pulse of the aforedescribed kind arises at the input terminals the load current flowing through the closed switch 12 undergoes an initial increase such that the output signal of the current measuring device 11 increase as well. As soon as the output signal furnished by the current measuring device 11 exceeds, in terms of its amount, the value defined by the reference voltage source 14 the output of the comparator 13 and thus also the output of the OR gate 19 is switched over to high level so that the switch 12 and thus the load 10 will be isolated from the output terminal A. Then the voltage at the input terminals E, E' changes over to the value defined by the network so that now the output voltage of the comparator 17 will exceed the value defined by the reference voltage source 16 while the output of the comparator 15 changes over to the high level. This means that a high level signal is present at the output of the OR gate 19 so that the switch 12 remains in open condition.

Only when the voltage of the interference pulse will again drop below the value defined by the reference voltage source 16 the output signal of the comparator 15 will change to the lower level. Since the switch 12 had been open before the output from the comparator 13 is at the lower level as well so that now the output from the OR gate 19 changes to the low level. In this manner, the switch 12 is closed while the load 10 is linked up with the network again so as to continue the (AC) power supply in "normal operation".

Upon the first start-up of the load 10—and this is valid specifically when the load 10 is formed by a power pack under primary clock pulse control—the guard circuit shown in FIG. 1 has the effect of a current-limiting device. When operation is started, i.e. when the capacitors of the load 10 do not yet store any charge, the current flowing through the guard circuit undergoes an abrupt increase. As soon as the current will have reached the defined limit value the switch 12 is opened. Since the input voltage detected by that point of time does not exceed the set maximum value and as the current will have dropped below the critical value again immediately due to the opening of the switch 12, the latter switch closes again so that the current will undergo a corresponding increase; this cycle is repetitive. The switching frequency or repetition frequency is determined by the delays in the components 11, 13, 19 and 12. When the switch 12 includes, for instance, a transistor the A-mode of operation of the system, i.e. a genuine maintenance of the input current at a constant value, must be avoided so as to avoid a high thermal load. In the circuit shown in FIG. 1 this is achieved by the switching characteristics of the comparator 13 or the OR gate 19. In order to prevent the switching frequency from becoming too high, which would, in its turn, entail another thermal load on the switch 12 during the switching processes, it is advantageous to operate with a starting delay when the switch 12 is closed. This is particularly expedient when the load current is to be limited on the (initial) start of the load and when the input current rather than the input voltage exceeds the maximum value permissible.

In the following, a circuit arrangement will be described with reference to FIG. 2 which illustrates a preferred embodiment of the present invention, wherein a power pack under primary clock pulse control is to be protected from interfering pulses. In that case, the input terminals E, E' are coupled to the output terminals of a bridge rectifier G which is provided in the power pack anyhow. The actual capacitive load 10 is then applied to the output terminals A, A' of the guard circuit.

Through a resistor R1 a parallel circuit is formed by a storage capacitor C and a Zener diode Z1 between the input terminals E and E'. Thus a DC voltage is applied at the terminals of the capacitor C, which is controlled through the Zener diode Z1 and which may be used for the power supply of additional components. In parallel to the storage capacitor C a series circuit is disposed which is constituted by a resistor R10 and another Zener diode Z2. A series circuit comprising two capacitors R11 and R12 bridges the Zener diode Z2. Thus a controlled voltage (potential relative to termianl E') is available at the juncture between the two resistors R11 and R12, which potential will be used as reference voltage. The components R10–R12, Z2 thus correspond to the reference voltage source 16.

The input terminal E' is connected to the emitter of a transistor T1 through a low-impedance precision resistor RM, the collector of said transistor being linked up with the output terminal A' through an inductor L (roughly 4 $\mu$H). The input terminal E is directly connected to the output terminal A. The juncture between the inductor L and the collector of the transistor T1 is linked up with the input terminal E through a diode D3.

The base and the collector of the transistor T1 communicate with each other through the drain-source line of a FET element T2, with the base of transistor T1 remaining in communication with the input terminal E' through a resistor R5.

The input terminal E continues to be connected to the input terminal E' through a series circuit comprising a Zener diode Z4 and two resistors R8, R9. The point of juncture of the two resistors R8, R9 is applied to the input terminal E' through a diode D1 and a Zener diode Z3. The point of junction of Diode D1 and Zener diode Z3 is applied to the (negative) input of a comparator V which continues to be connected through resistor R4 to the juncture between the emitter of transistor T1 and the precision resistor RM. Moreover, the inverting input of the comparator V is applied to the controller of transistor T1 through a series circuit comprising a capacitor C1, a diode D2 and a resistor R6. The point of junction between the capacitor C1 and the diode D2 is linked up with the inverting input of comparator V through a resistor R7.

The non-inverting input of comparator V is connected firstly with the juncture between the resistors R11 and R12 and secondly through a resistor R3 to its output and the GATE terminal of transistor T2. Moreover, the GATE terminal of transistor T2 is applied to the juncture between resistor R1 and the storage capacitor C through a resistor R2.

This system operates as follows:

Whenever an interfering pulse occurs between the terminals E, E' the current flowing through the precision resistor RM increases so that the potential at the inverting input of the comparator V will increase as well. As soon as this potential will exceed the voltage at the non-inverting input of the comparator V the latter's output signal will drop to a lower potential so that the transistor T2 will change over the to the blocking mode. Thus, the base of transistor T1 is changed over to a lower potential through resistor R5 so that the transistor T1 will become non-conductive and thus interrupt the load current.

As soon as the load current will have been disconnected the voltage at terminals E, E' will increase so that now the Zener diode Z4 will become conductive and thus the potential at the juncture between the resistors R8 and R9 will be increased as well. This voltage is applied through diode D1 to the inverting input of comparator V and is limited to a value safe for the comparator V, through the Zener diode Z3.

If thus the load current will be reduced when transistor T2 is in its non-conducting state and thus the potential at the point of junction between the precision resistor RM and the emitter of transistor T1 will be reduced as well the output of amplifier V will remain at the negative potential (thus blocking the transistors) until the voltage at the input terminals E, E' will have dropped by an amount so high that the Zener diode Z4 will change back into its non-conductive state. With this arrangement, the series circuit comprising the diode D2 and capacitor C1, bridged by resistors R7, is provided to the effect that the transistors will be blocked rapidly while they will be driven again with a delay, however.

In the following, another preferred embodiment of the present invention will be described in more detail with reference to FIG. 3. This embodiment is a guard circuit furnishing an AC current at its output, which means that it may added in series to any capacitive load.

Figure 3:
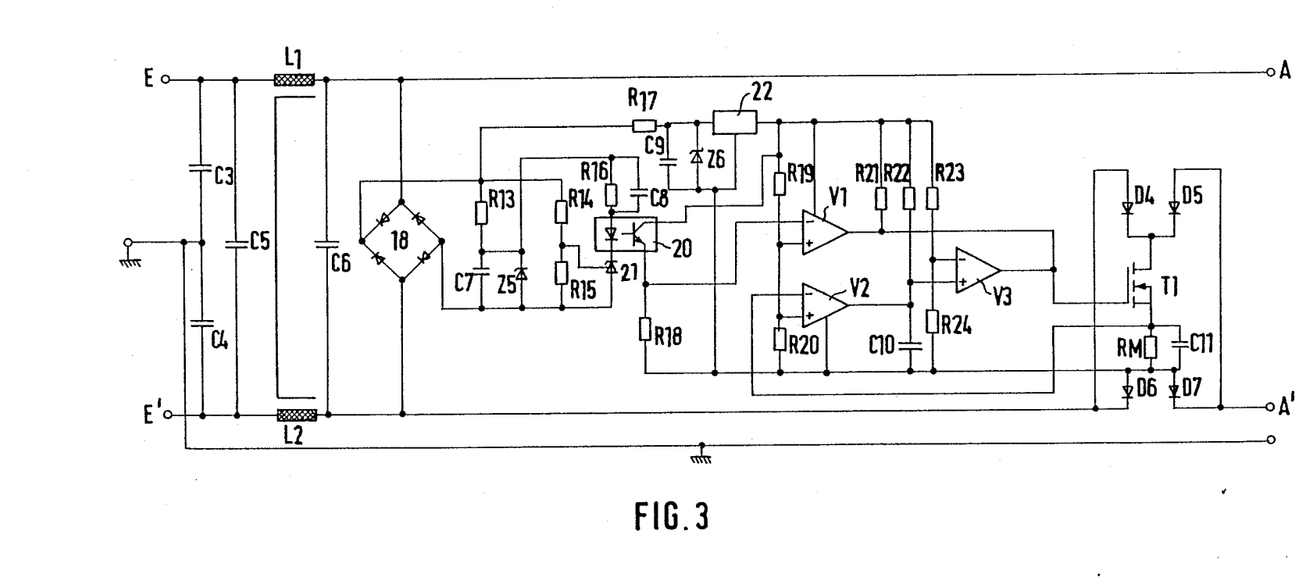
FIG. 3 shows another preferred embodiment of the present invention for application as a "series" device.

In the system in FIG. 3, the input terminal E is connected to the output terminal A of the circuit through an inductor L1. The inductor L1 is magnetically coupled to an inductor L2 between the input terminal E' and one of the terminals of the controllable switch whose other terminal is connected to the output terminal A' of the guard circuit. The controllable switch includes a diode D6 whose cathode is connected to the input terminal E' while its anode is connected to the cathode of diode D5 through a precision resistor RM and the drain-source line of a transistor T1, the anode of diode D5 being applied to the output terminal A'. Moreover, the input terminal E' is connected to the output terminal A' through the anode-cathode connection of diode D4, the drain-source line of transistor T1, the precision resistor RM and the anode-cathode line of a diode D7. In parallel to the precision resistor RM, a capacitor C11 is disposed for compensation if its inductance (which is present specifically in the event of wire resistors). When the transistor T1 is driven thus, depending on the direction of current flow, the current flows either through the line D4, T1, RM and D7, or through the line D6, RM, T1 and D5.

For suppression of interferences, a series circuit constituted by two capacitors C3, C4 is coupled to the input terminals E, E' whose junction point is connected to the chassis. Moreover, capacitors C5 and C6 are disposed ahead of and following the inductors L1, L2 connecting the two lines, so as to filter high-speed interfering pulses.

The input terminals of a bridge rectifier 18 are connected to the output terminals of the inductors L1 and L2 to ensure the power supply of the active devices in the system and to monitor the instantaneous input voltage. The output terminals of the bridge rectifier 18 are connected to a series circuit constituted by a resistor R13 and a capacitor C7, with capacitor C7 being applied through a Zener diode Z5. At the juncture between the resistor R13 and the capacitor C7 thus a DC voltage is applied which is stabilized through the Zener diode Z5.

The point of junction between the resistor R13 and the capacitor C7 is connected to the anode of the LEDs of an opto-coupler 20 through a parallel circuit composed of a resistor R16 and a capacitor C8, the cathode of said opto-coupler being in communication with the cathode of a shunt controller while the anode is applied to the anode of the Zener diode Z5.

The output terminals of the rectifier 18 are moreover interlinked through a series circuit made up by two resistors R14, R15. The juncture between the resistors R14 and R15 is couled to the control input of the shunt controller 21. The shunt controller 21 is a comparator with built-in reference voltage, which connects through whenever the voltage between its control input and its anode exceeds a defined value while it opens when the voltage drops below a specified limit.

The output terminal of rectifier 18, to which the resistors R13 and R14 are applied, is coupled to the input of a voltage stabilizer 22 through a resistor R17 whose ground input is coupled not only to the input, through a parallel circuit consisting of a capacitor C9 and a Zener diode Z6, but also to the juncture of diodes D6 and D7 and the precision resistor RM. The output of the controller 22 furnishes a stabilized voltage which three open-collector comparators V1 to V3 use for power supply.

The output of controller 22 is moreover connected to the control input through the collector-emitter section of the transistor in the opto-coupler 20 and a resistor R18. The juncture between the opto-coupler 20 and the resistor R18 is applied to the inverting input of the first comparator V1 whose non-inverting input is applied to the juncture of two resistors R19, R20 which are inserted between the output and the ground input of the controller 22. Moreover, the non-inverting input of the second comparator V2 is also applied to that juncture while the inverting input of that comparator is applied to the juncture between the transistor T1 and the precision resistor RM.

The output of comparator V1 is connected to the output of controller 22 through a resistor R21 and, at the same time, directly to the gate of transistor T1.

The output of comparator V2 is connected to the juncture with a series circuit constituted by a resistor R22 and a capacitor C10, with resistor R22 being applied to the output of controller 22 while capacitor C10 is connected to the ground input of controller 22. Moreover, the non-inverting input of the third comparator V3 is in communication with the output of comparator V2, the inverting input of this third comparator being coupled to the juncture of a series circuit comprising two resistors R23 and R24. The R23-R24 series circuit is inserted between the output and the ground input of the controller 22. The output of the comparator V3 is coupled to the gate of transistor T1 as well.

This system operates as follows:

When the current flowing through the load resistor RM undergoes an increase the potential at the inverting input of the comparator V2 rises. As soon as this potential exceeds the potential at the non-inverting input of the comparator the output transistor of the V2 comparator connects through so that the potential at the non-inverting input of comparator V3 drops below the level at the comparator's inverting input while the output transistor of comparator V3 connects through as well. In this manner, the gate of transistor T1 is reduced to a lower potential while transistor T1 enters into back operation.

Substantially simultaneously with back operation of transistor T1, the voltage applied at the output of rectifier 18 is increasing so that the voltage across resistor R15 undergoes a proportional increase while the shunt controller 21 connects through so that the light emitter of the opto-coupler 20 is supplied through the parallel circuit constituted by the resistor R16 and the capacitor C8 and provides for the through-connection of the transistor of the opto-coupler 20. With this constellation the capacitor C8 effects an acceleration of the switching process. As soon as the transistor of the opto-coupler 20 is through-connected the inverting input of the comparator V1 is changed over to a high level (relative to its non-inverting input) so that the output transistor of the comparator V1 is through-connected. Even if the output transistor of the comparator V3 is opened again the gate terminal of transistor T1 remains at the low potential and thus the transistor is kept in reverse operation until the voltage at the input terminals E, E' drops again to an unrisky value.

When a capacitive load is switched on for the first time the aforedescribed sequence of switching steps takes place in an analogous manner, however with the output transistor of comparator V1 always remaining in reverse operation since the input voltage does not exceed the value defined by the shunt controller 21. As soon as in such a case the T1 transistor is in back-operation so that the voltage across the precision resistor RM will drop again with the affect that the output transistor of the V2 comparator is in back-operation, the potential at the non-inverting input of the V3 comparator will rise. This rise time is defined, however, by the time constant of the low-pass filter constituted by the resistor R22 and the capacitor C10 so that a maximum switching frequency of the T1 transistor will be set. In any case, this system ensures that the transistors T1 will not operate in the A-mode. What is essential in this arrangement is the fact that the change-over to the reverse operation of the transistor T1 takes place at a high speed (under control of the output resistor of the V2 comparator and the capacitor C10) while the through-connection of the transistor T1 is delayed (as defined by R22 and C10).

Figure 4:
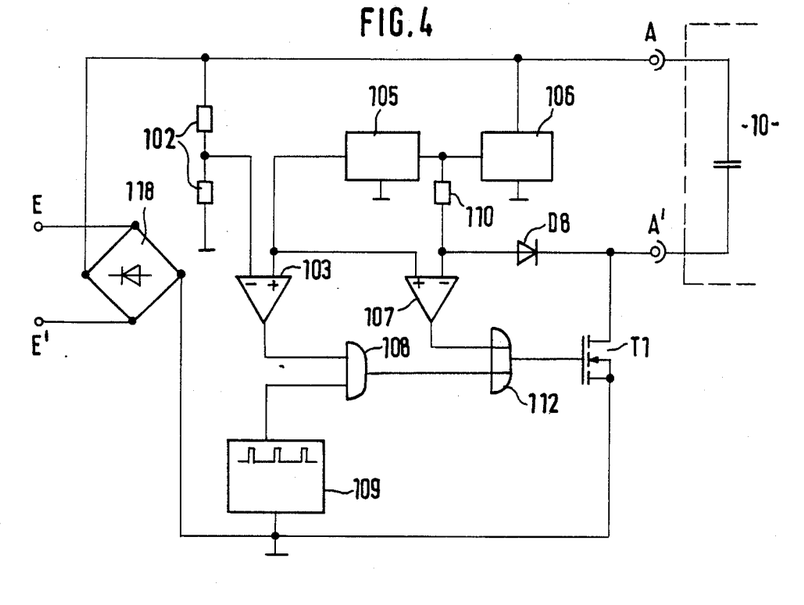
FIGS. 4/5 show another embodiment of the invention.

FIG. 4 illustrates another, particularly preferred embodiment of the invention which includes, at the input terminals E, E', a bridge rectifier 118 whose one DC output is directly connected to output A while its other DC output is connected to output A' through transistor T1. That output of rectifier 118 which is connected to transistor T1 is also applied to the chassis.

A series circuit 102 is inserted between the chassis and that output of rectifier 118 which is connected to output A, this series circuit being composed of two resistors to whose coupling juncture, which divides the voltage, the inverting input of a comparator 103 is connected. The non-inverting input of comparator 103 is applied to the output of a stabilized-voltage source 105 which furnishes a reference voltage while its input-side terminal is applied to an auxiliary voltage source 106 supplied by the DC output of the rectifier 118. The output of comparator 103 is connected to one input of an AND gate 108 whose other input is connected to the output of a pulse generator 109. The output of the AND gate 108 is connected to one of the inputs of an OR gate 112 whose output is coupled to the GATE input of the T1 transistor.

Moreover, the non-verting input of another comparator 107 is connected to the output terminal of the stabilized-voltage source 105 while the inverting input of that comparator is coupled to the output of the auxiliary voltage source 106 through a resistor 110. The inverting input of the comparator 107 continues to be linked up with output A' through a diode D8. The output of comparator 107 is connected to the second input of the OR gate 112.

The generator 109 supplies a periodically repeated narrow needle pulse whose pulse width and repetitive frequency are so selected that the transistor T1 may be controlled in any case without any problem since its current presents a limited rising steepness (as a result of line inductors).

The aforedescribed circuit operates as follows:

The DC voltage supplied from the rectifier 118 is reduced to a lower level through the voltages divider circuit 102 and is then compared in the comparator 103 against the reference voltage furnished by the stabilized-voltage source 105 (employed here as a reference voltage source). Thus, at the output of comparator 103 appears a positive level only when the mains voltage will not exceed the permissible maximum value. This means at the same time that the needle pulses arriving from generator 109 will be fed to the gate of transistor T1 through the AND gate 108 and through the OR gate 112 only as long as overvoltage is not present.

As long as no excessive current will flow through the T1 transistor into the load 10 this current may be connected through from the output pulse of generator 109 or the corresponding output signal of the AND gate 108 and the OR gate 112 up to the saturation level, whereupon it reduces, through diode D8, the voltage at the resistor to an extent such that the comparator 107 will furnish a positive signal at its output. This positive signal is then applied to the GATE of the T1 switching transistor through the OR circuit 112, keeping the transistor in through-connected state.

Whenever an overvoltage trouble (interfering pulse) will arise in the network and thus at the output terminals of the rectifier 118 the load or charging current of the load 10 will rise which is connected to output A, A' of the guard circuit. The charging current for the load, which is passed through the T1 transistor, causes an immediate increase of the transistor's saturation voltage so that the potential at the inverting input of the comparator 107 will rise, too, through diode D8. When the potential at this point will exceed the reference potential at the output terminal of the stabilized-voltage source 105 the comparator 107 will deactivate the T1 transistor through the OR circuit 112. As in that case, initially an overvoltage is applied as well the output at the comparator 103 is negative so that the AND gate 108 is blocked so that no pulses from the generator 109 could connect-through the transistor T1 through the second input of the OR gate 112. The T1 transistor thus remains deactivated as long as there prevails an overvoltage condition in the mains network as the generator output voltage through comparator 103 and the AND gate 108 is blocked.

Only when the mains voltage will have reached again an admissible value and will have dropped below the reference voltage source 105 the output of the comparator 103 will return to a positive level and open the AND gate 108 so that the output pulses from generator 109 may through-connect again the T1 transistor. Upon the arrival of the first control pulse from the generator, the T1 transistor will operate in through-connecting mode and will—as described in the foregoing—maintained in through-connected condition through the comparator 107 and the diode D8.

The supply potential required for the comparators 103, 107, the gate circuits 108 and 112 as well as for generator 109 is generated from the rectified mains voltage by means of the auxiliary voltage source 106. It is possible, too, of course, to derive the supply voltage directly from the mains potential.

When the switching transistor T1 is controlled through an opto-coupler and when the latter is provided with its own bridge rectifier this preferred embodiment of the present invention may also be designed as an independent series module, as has been described with reference to the embodiment shown in FIG. 3.

Figure 2:
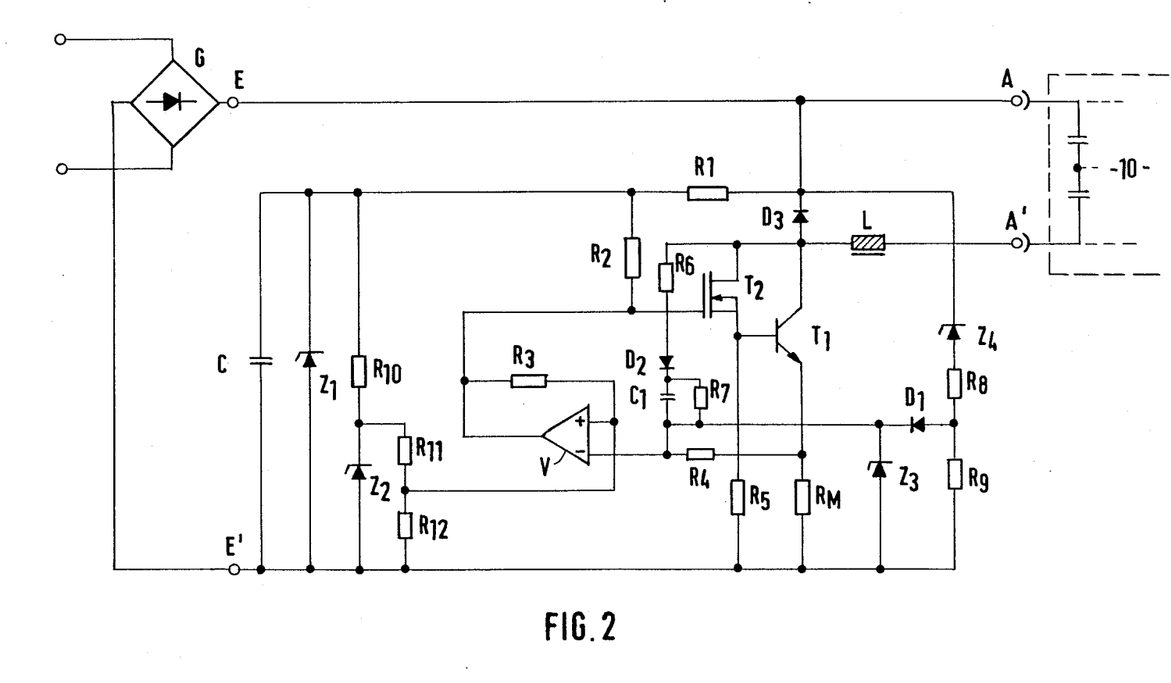
FIG. 2 illustrates a first preferred embodiment of the invention for application in a power pack under primary clock pulse control.

It is also possible, of course, to use any other type of controllable semiconductor device rather than a field effect transistor T1, which would be suitable, on account of its characteristics, to substitute the RM resistor (see FIGS. 2 and 3).

Figure 5:
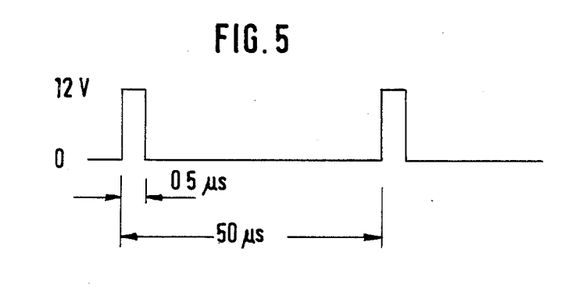

The essential advantage entailed by the circuit described with reference to FIGS. 4 and 5 resides, on the one hand, in the fact that a load resistor is not required and that thus the circuit design is simplified (even a structure in the form of a monolithic IC is possible) and, on the other hand, in the aspect that the switching transistor T1, which is required anyhow, may also be used at the same time as a current detector "resistor" so that the circuit complexity is generally reduced.

We claim:

1. Guard circuit for the protection of capacitive loads from pulse-shaped overvoltages and interference pulses from an AC supply network, comprising
    a current detector means to detect the amplitude of a DC current flowing through the load and to emit a first blocking signal at least when the amplitude of the detected current exceeds a defined maximum value,
    a voltage detector means to detect the amplitude of a DC voltage applied in said supply network and to emit a second blocking signal when the amplitude of the detected voltage exceeds a defined maximum value, and
    a controllable switching means communicating with and under control of said current detector means and said voltage detector means so as to isolate the load from the supply network, with said controllable switching means isolating the load from the supply network when at least one of said first or second blocking signals is applied.

2. Guard circuit according to claim 1, comprising a delay means to emit said first blocking signal during a defined delay period following the time by which the current flowing through the load drops below the maximum current.

3. Guard circuit according to claim 2, wherein the said delay means includes an RC low-pass filter.

4. Guard circuit according to claim 1, comprising a filter means to filter the current flowing through the load and to attenuate high-frequency interference voltages and conducted interferences from the load.

5. Guard circuit according to claim 1, wherein the said controllable switching means includes a switching transistor in a cross branch of a bridge circuit constituted by diodes in an anti-parallel circuit arrangement.

6. Guard circuit according to claim 1, wherein the said voltage detector means includes an opto-coupler for the electrical isolation and decoupling of said second blocking signal.

7. Guard circuit according to claim 1, wherein the said current detector means includes an opto-coupler for the electrical isolation and decoupling of said first blocking signal.

8. Guard circuit according to claim 1, characterized by a power supply unit including an energy storage means for the supply of said current detector means and said voltage detector means with electrical energy from said AC power supply network.

9. Guard circuit according to claim 1, wherein the said current detector means is connected to said switching means so as to detect the voltage drop across the switching means, which occurs due to the current flow.

10. Guard circuit according to claim 1, wherein the said controllable switching means includes a logic circuit provided with an OR-function and comprising signal inputs, while the said current detector means and voltage detector means respectively include comparator means to generate said first and second blocking signals, and wherein the logic circuit inputs are connected to outputs from said comparator means.

11. Power pack under primary clock-pulse control, including an input rectifier to rectify an AC current from an AC power supply network as well as to emit a rectified voltage, and including smoothing capacitors to smooth the rectified AC voltage, a guard circuit for protection against pulse-shaped overvoltages and interference pulse in said AC power supply network, a current detector means to detect the current flowing and to emit a first blocking signal which is output when the amount of the current flowing exceeds a preset maximum value, a voltage detector means to detect the voltage in said supply network and to emit a second blocking signal which is output when the amount of the detected voltage exceeds a preset maximum value, as well as a controllable switching means to isolate at least said smoothing capacitors from said supply network in response to the application of at least said first or second blocking signal.

12. Power pack under primary clock pulse control, according to claim 11, wherein said guard circuit is coupled between the input rectifier and said smoothing capacitors.

* * * * *

UNITED STATES PATENT AND TRADEMARK OFFICE
CERTIFICATE OF CORRECTION

PATENT NO. : 4,935,836

DATED : June 19, 1990

INVENTOR(S) : JUERGEN LABBUS, ET AL.

It is certified that error appears in the above-identified patent and that said Letters Patent is hereby corrected as shown below:

Col. 1, lines 36-37, change "Elektrotechnink" to --Elektrotechnik--.

Col. 2, line 35, change "present maximum" to --preset maximum--.

Col. 2, line 38, change "present maximum" to --preset maximum--.

Col. 2, line 54, change "transformer" to --transformers--.

Col. 3, line 55, change "as furnish" to --as to furnish--.

Col. 4, line 8, change "comparator 13 and 15" to --comparators 13 and 15--.

Col. 4, line 22, change "device 11 increase" to --device 11 increases--.

Col. 4, line 27, change "to high level" to --to the high level--.

Col. 5, lines 28-29, change "comprising two capacitors" to --comprising two resistors--.

Col. 5, line 30, change "termianl E'" to --terminal E'--.

UNITED STATES PATENT AND TRADEMARK OFFICE
CERTIFICATE OF CORRECTION

PATENT NO. : 4,935,836
DATED : June 19, 1990
INVENTOR(S) : JUERGEN LABBUS, ET AL.

It is certified that error appears in the above-identified patent and that said Letters Patent is hereby corrected as shown below:

Col. 6, line 11, change "over the to the" to --over to the--.

Col. 8, line 44, change "affect" to --effect--.

Col. 9, line 13, change "non-verting" to --non-inverting--.

Col. 10, line 8, after "reference voltage" insert --at the output terminal of the stabilized-voltage--.

Signed and Sealed this

Twenty-eighth Day of January, 1992

Attest:

HARRY F. MANBECK, JR.

*Attesting Officer*        *Commissioner of Patents and Trademarks*